(12) United States Patent
Fritz et al.

(10) Patent No.: US 9,598,080 B2
(45) Date of Patent: Mar. 21, 2017

(54) SELF-PROPELLED CIVIL ENGINEERING MACHINE AND METHOD OF CONTROLLING A CIVIL ENGINEERING MACHINE

(71) Applicant: Wirtgen GmbH, Windhagen (DE)

(72) Inventors: Matthias Fritz, Linz/Rhein (DE); Martin Dahm, Gieleroth (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 32 days.

(21) Appl. No.: 14/922,790

(22) Filed: Oct. 26, 2015

(65) Prior Publication Data

US 2016/0107647 A1     Apr. 21, 2016

(30) Foreign Application Priority Data

Jan. 25, 2012   (DE) .......................... 10 2012 001289

(51) Int. Cl.
| | |
|---|---|
| *B60W 30/18* | (2012.01) |
| *E01C 19/00* | (2006.01) |
| *B60W 10/04* | (2006.01) |
| *B60W 10/20* | (2006.01) |
| *E01C 19/48* | (2006.01) |
| *E02F 9/20* | (2006.01) |

(52) U.S. Cl.
CPC ............ *B60W 30/18* (2013.01); *B60W 10/04* (2013.01); *B60W 10/20* (2013.01); *E01C 19/00* (2013.01); *E01C 19/004* (2013.01); *E01C 19/008* (2013.01); *E01C 19/4886* (2013.01); *E02F 9/2045* (2013.01); *B60W 2300/17* (2013.01); *B60W 2530/18* (2013.01); *B60W 2710/20* (2013.01); *B60W 2720/10* (2013.01)

(58) Field of Classification Search
CPC ............... E01C 19/008; E01C 19/4873; E01C 19/4893; E01C 23/088; E01C 23/163; E01C 19/004; E02F 9/2045
See application file for complete search history.

(56) References Cited

U.S. PATENT DOCUMENTS

| | | | |
|---|---|---|---|
| 4,041,623 A | 8/1977 | Miller et al. | |
| 5,288,167 A | 2/1994 | Gaffard et al. | |
| 5,327,345 A | 7/1994 | Nielsen et al. | |
| 5,519,620 A | 5/1996 | Talbot et al. | |
| 5,549,412 A | 8/1996 | Malone | |

(Continued)

FOREIGN PATENT DOCUMENTS

| | | |
|---|---|---|
| DE | 19750315 A1 | 5/1998 |
| DE | 29918747 U1 | 2/2000 |

(Continued)

OTHER PUBLICATIONS

European Search Report in corresponding European Patent Application EP 13 00 0106, dated Jun. 13, 2013, 6 pp. (not prior art).

*Primary Examiner* — Abigail A Risic
(74) *Attorney, Agent, or Firm* — Lucian Wayne Beavers; Patterson Intellectual Property Law PC

(57) ABSTRACT

A civil engineering machine and a method of controlling the machine are based on the position of at least one reference point which is relevant to the control of the civil engineering machine being changed, as the civil engineering machine moves, as a function of a relative position of the at least one reference point relative to a desired path of travel.

16 Claims, 12 Drawing Sheets

(56) References Cited

U.S. PATENT DOCUMENTS

| | | |
|---|---|---|
| 5,612,864 A | 3/1997 | Henderson |
| 5,631,658 A | 5/1997 | Gudat et al. |
| 5,838,277 A | 11/1998 | Loomis et al. |
| 5,929,807 A | 7/1999 | Viney et al. |
| 5,988,936 A | 11/1999 | Smith |
| 6,027,282 A | 2/2000 | Horn |
| 6,047,227 A | 4/2000 | Henderson et al. |
| 6,074,693 A | 6/2000 | Manning |
| 6,088,644 A | 7/2000 | Brandt et al. |
| 6,109,825 A | 8/2000 | Yon |
| 6,113,309 A | 9/2000 | Hollon et al. |
| 6,140,957 A | 10/2000 | Wilson et al. |
| 6,144,318 A | 11/2000 | Hayashi et al. |
| 6,191,732 B1 | 2/2001 | Carlson et al. |
| 6,287,048 B1 | 9/2001 | Hollon et al. |
| 6,371,566 B1 | 4/2002 | Haehn |
| 6,425,186 B1 | 7/2002 | Oliver |
| 6,481,924 B1 | 11/2002 | Smolders et al. |
| 6,655,465 B2 | 12/2003 | Carlson |
| 6,736,216 B2 | 5/2004 | Savard |
| 6,769,836 B2 | 8/2004 | Lloyd |
| 6,950,059 B2 | 9/2005 | Rapoport |
| 7,002,513 B2 | 2/2006 | Brabec |
| 7,363,154 B2 | 4/2008 | Lindores |
| 7,399,139 B2 | 7/2008 | Kieranen |
| 7,491,014 B2 | 2/2009 | Sick |
| 7,617,061 B2 | 11/2009 | Brabec |
| 7,643,923 B2 | 1/2010 | Buehlmann et al. |
| 7,946,787 B2 | 5/2011 | Glee et al. |
| 8,018,376 B2 | 9/2011 | McClure |
| 8,174,437 B2 | 5/2012 | Whitehead |
| 8,271,194 B2 | 9/2012 | Whitehead |
| 8,388,263 B2 | 3/2013 | Fritz |
| 2004/0057795 A1 | 3/2004 | Mayfield et al. |
| 2004/0193348 A1 | 9/2004 | Gray et al. |
| 2007/0290182 A1 | 12/2007 | Noeske et al. |
| 2008/0208417 A1 | 8/2008 | Buehlmann et al. |
| 2008/0253834 A1 | 10/2008 | Colvard |
| 2010/0023229 A1 | 1/2010 | Chiocco |
| 2010/0201994 A1 | 8/2010 | Buehlmann |
| 2011/0150572 A1 | 6/2011 | Fritz et al. |
| 2011/0229264 A1 | 9/2011 | Weiser |
| 2012/0090909 A1 | 4/2012 | Menzenbach et al. |
| 2012/0101725 A1 | 4/2012 | Kondekar |
| 2014/0165693 A1 | 6/2014 | Buschmann et al. |
| 2014/0348584 A1 | 11/2014 | Fritz et al. |

FOREIGN PATENT DOCUMENTS

| | | |
|---|---|---|
| DE | 69131837 T2 | 6/2000 |
| DE | 102008023743 A1 | 11/2009 |
| DE | 102009059106 A1 | 6/2011 |
| EP | 1103659 A2 | 5/2001 |
| EP | 1118713 A1 | 7/2001 |
| EP | 2336424 A2 | 6/2011 |
| WO | 9203701 A1 | 3/1992 |

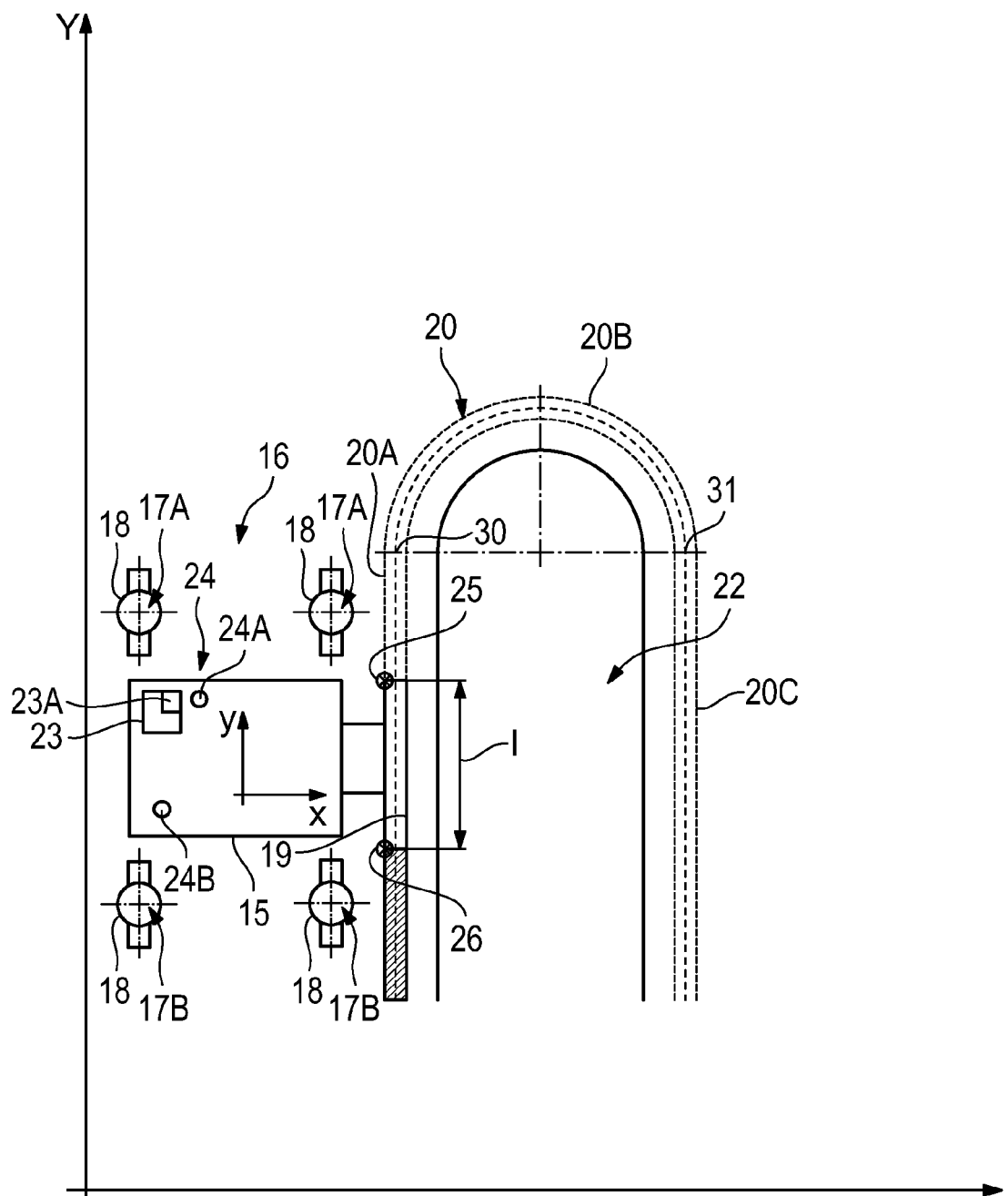
FIG. 3.1

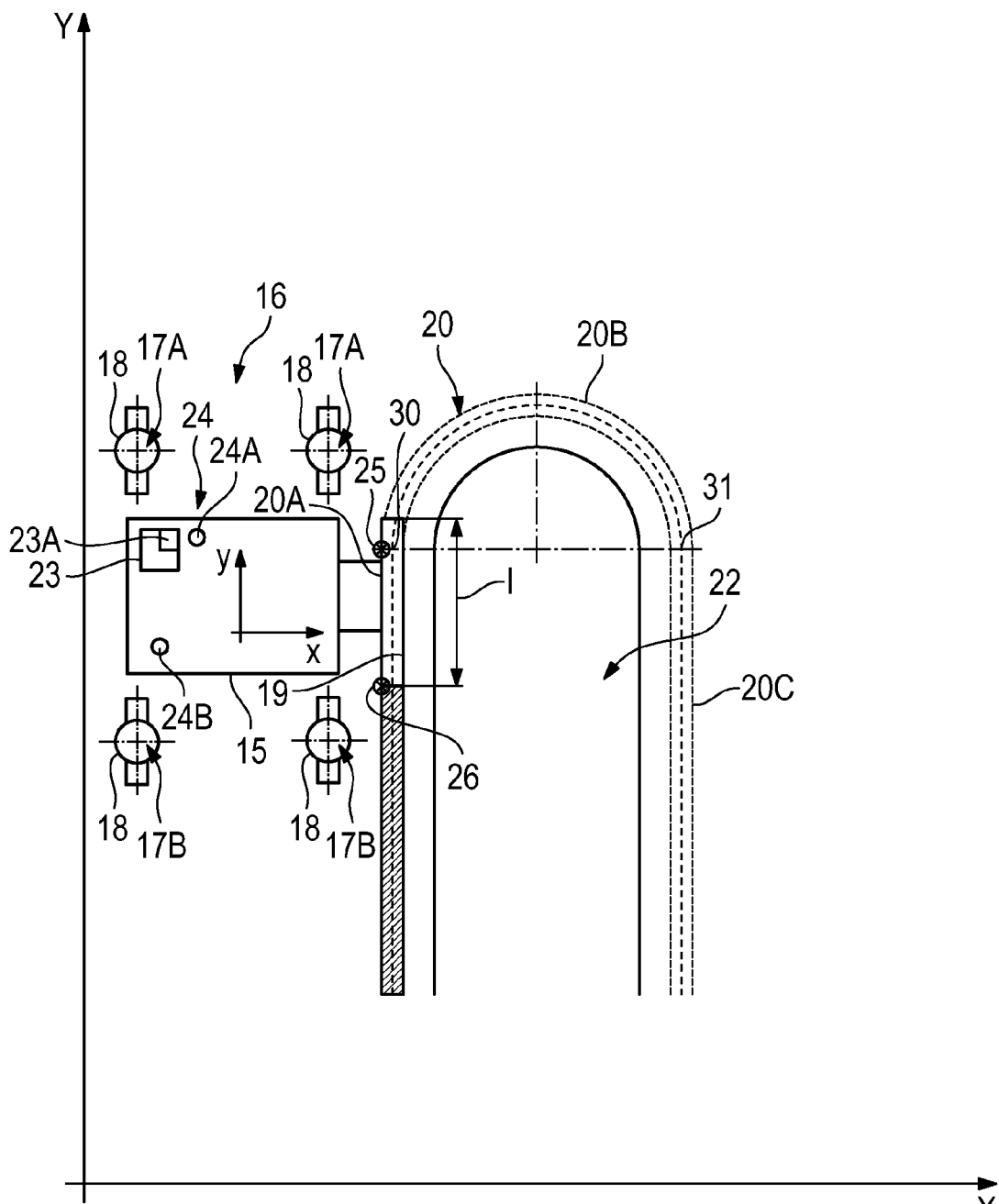
FIG. 3.2

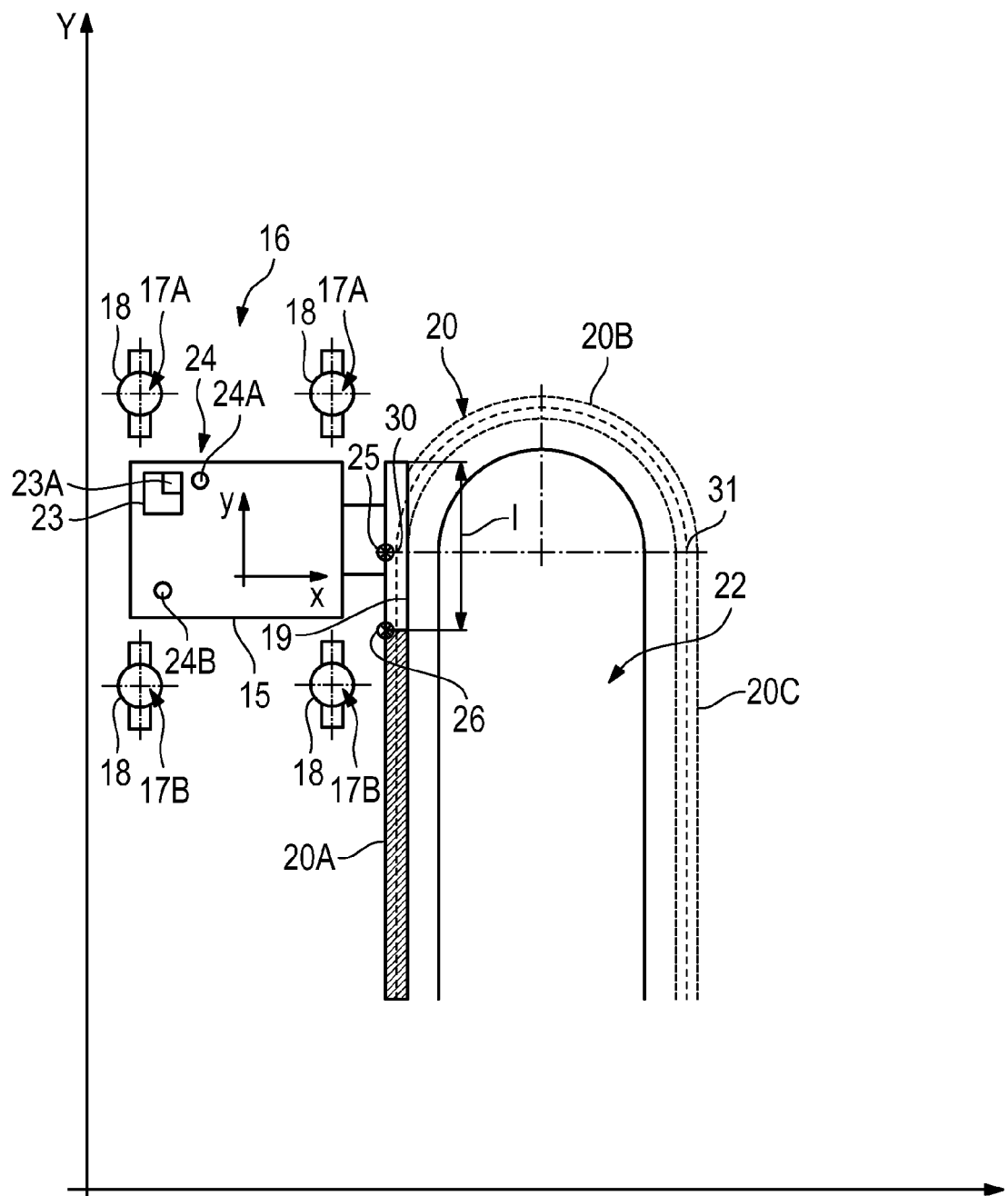
FIG. 3.3

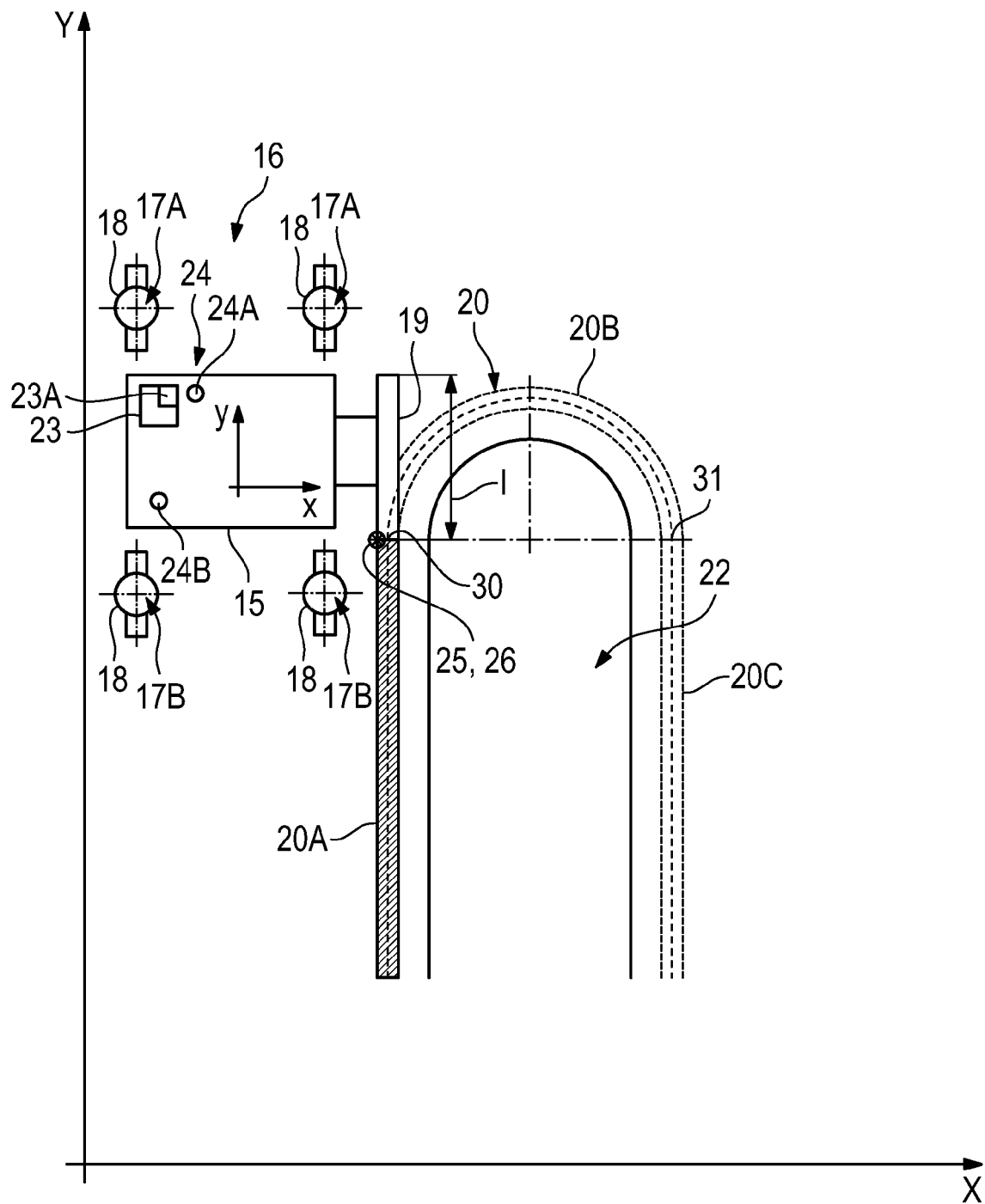
*FIG. 3.4*

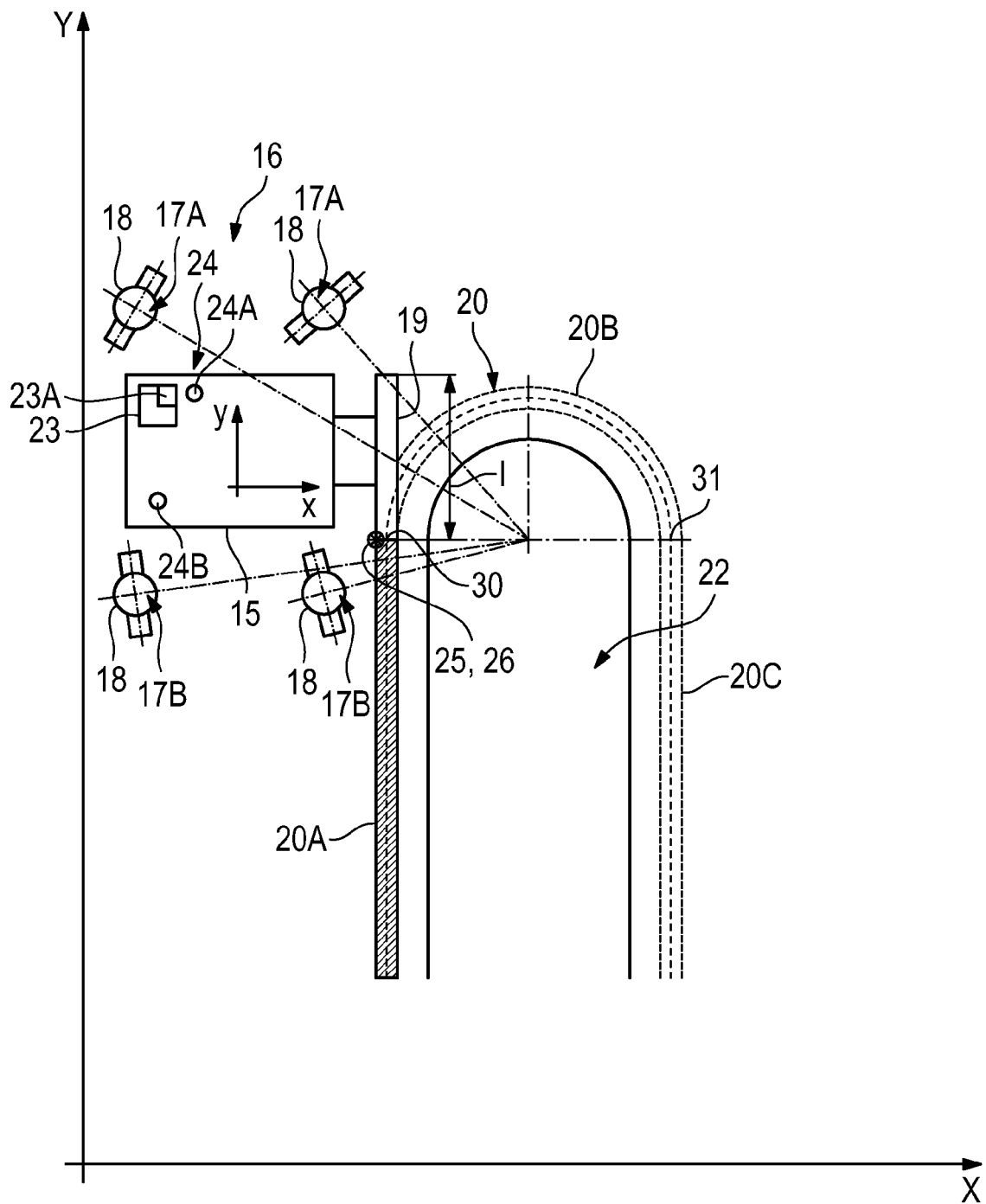
FIG. 3.5

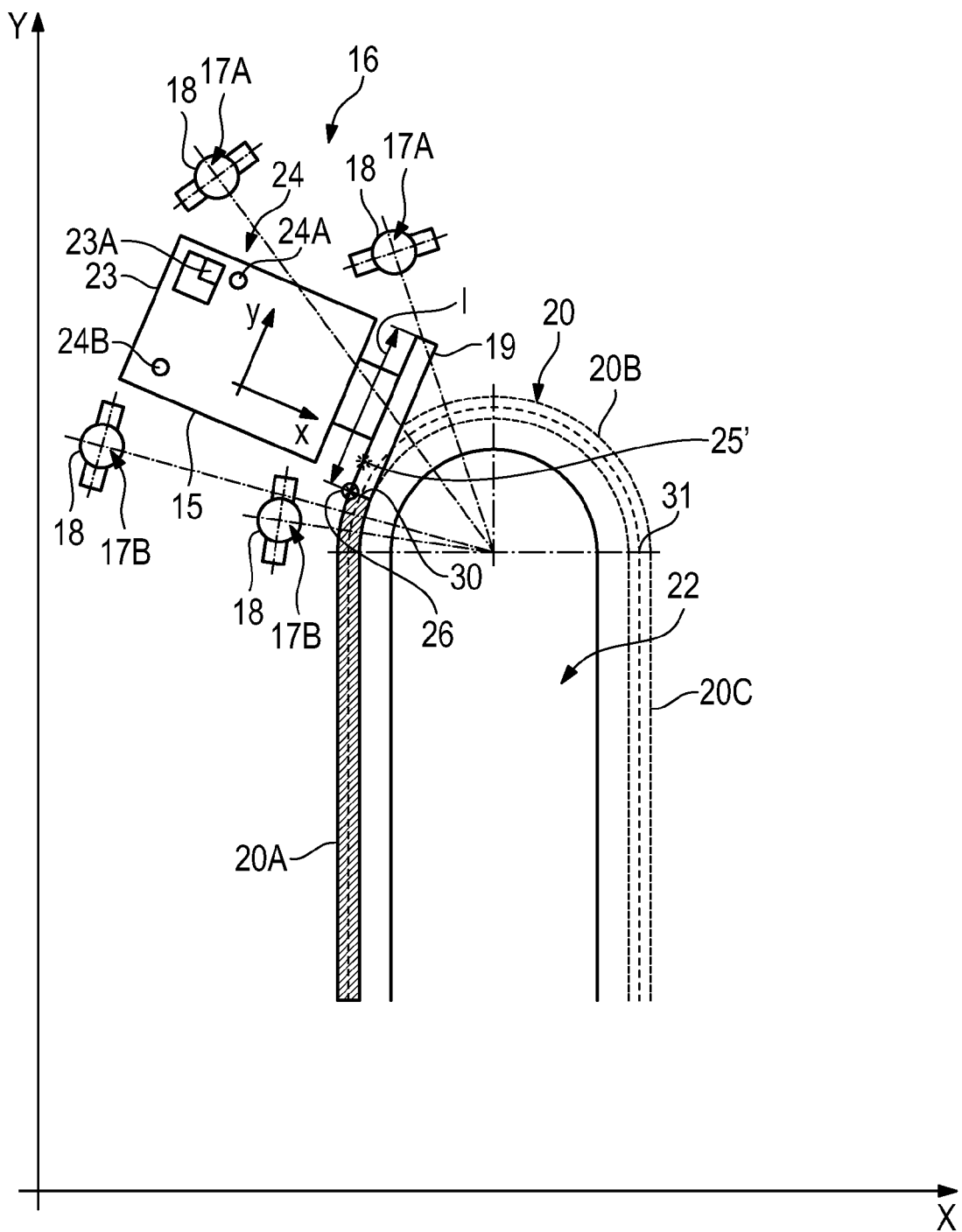
FIG. 3.6

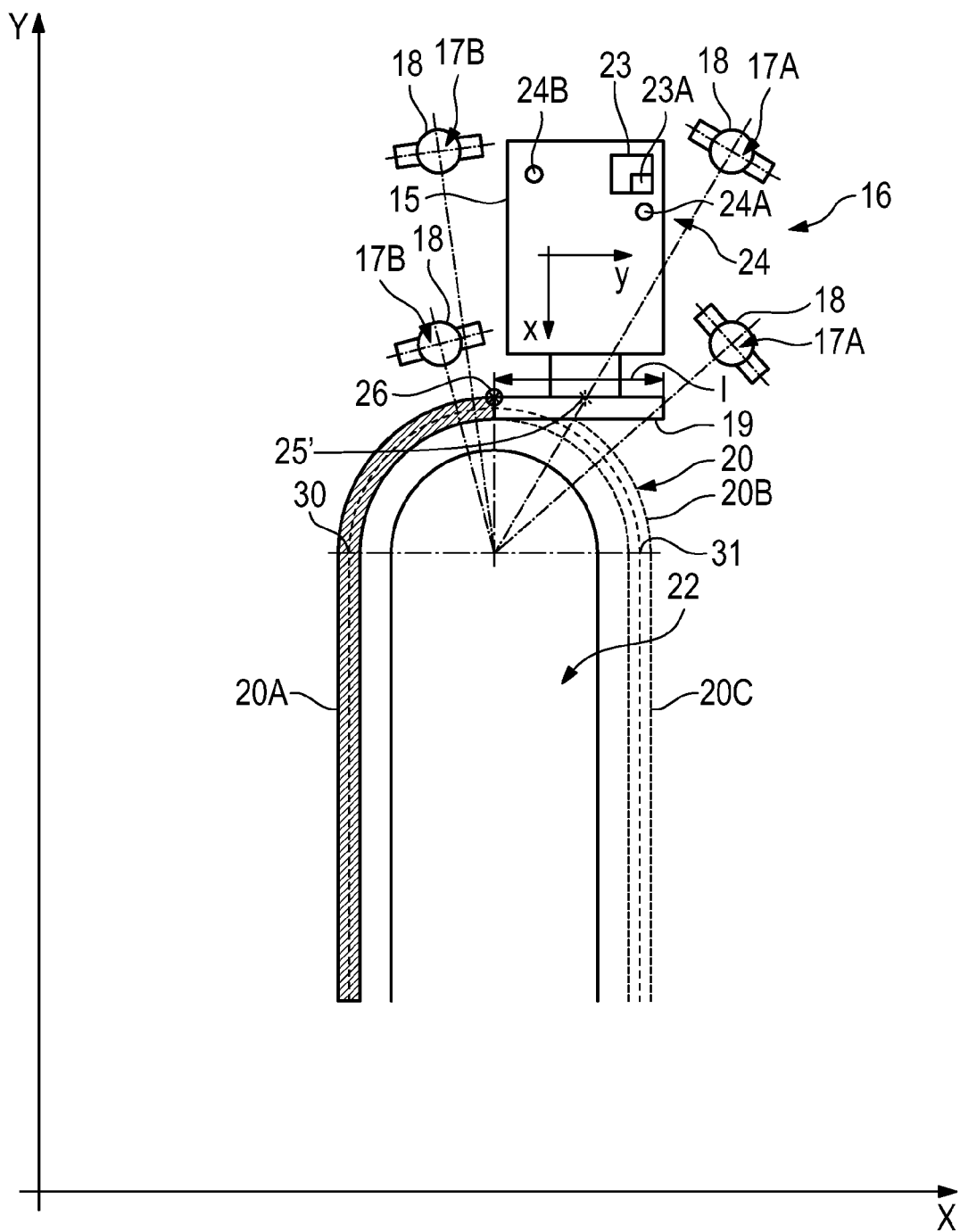
FIG. 3.7

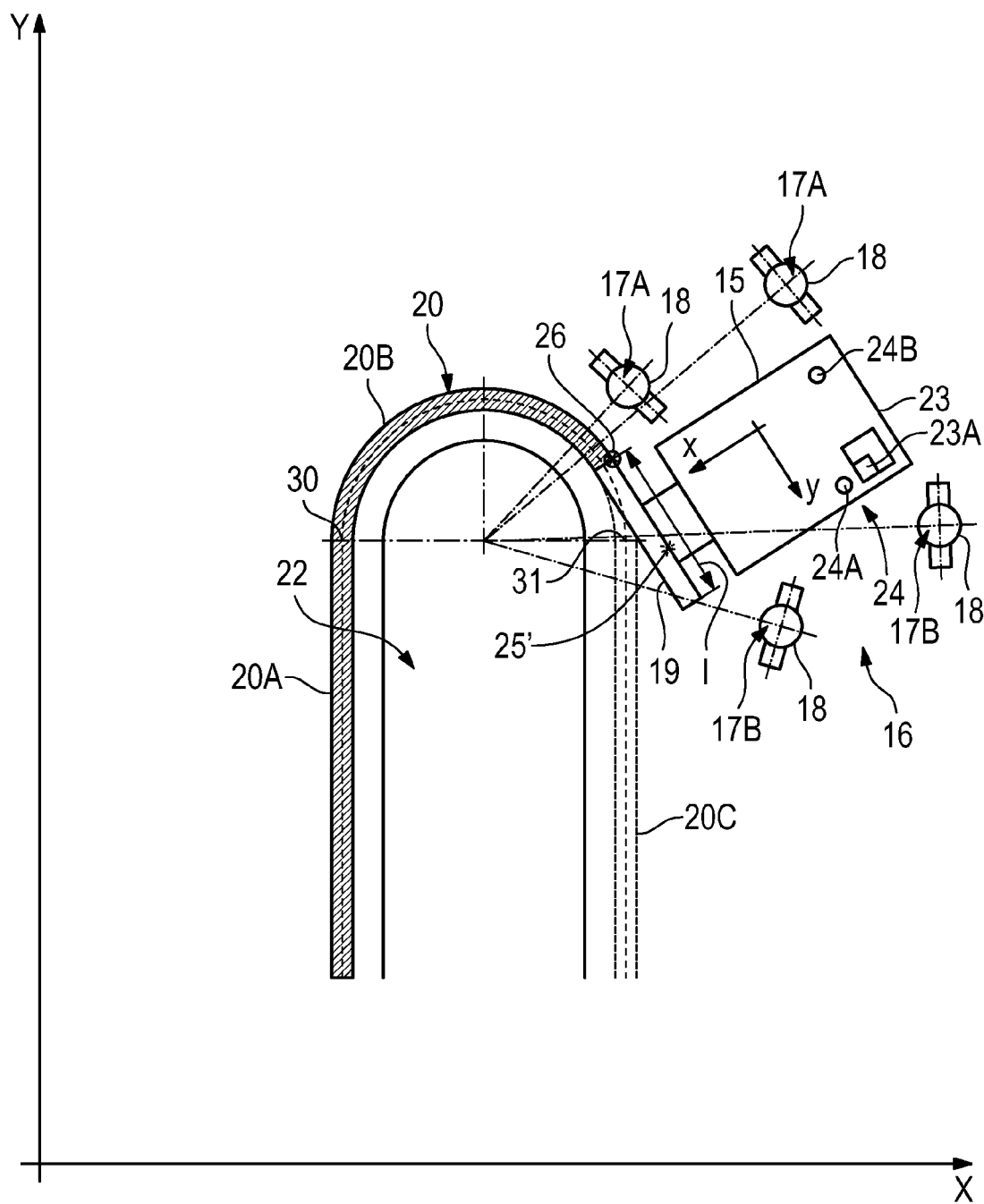
FIG. 3.8

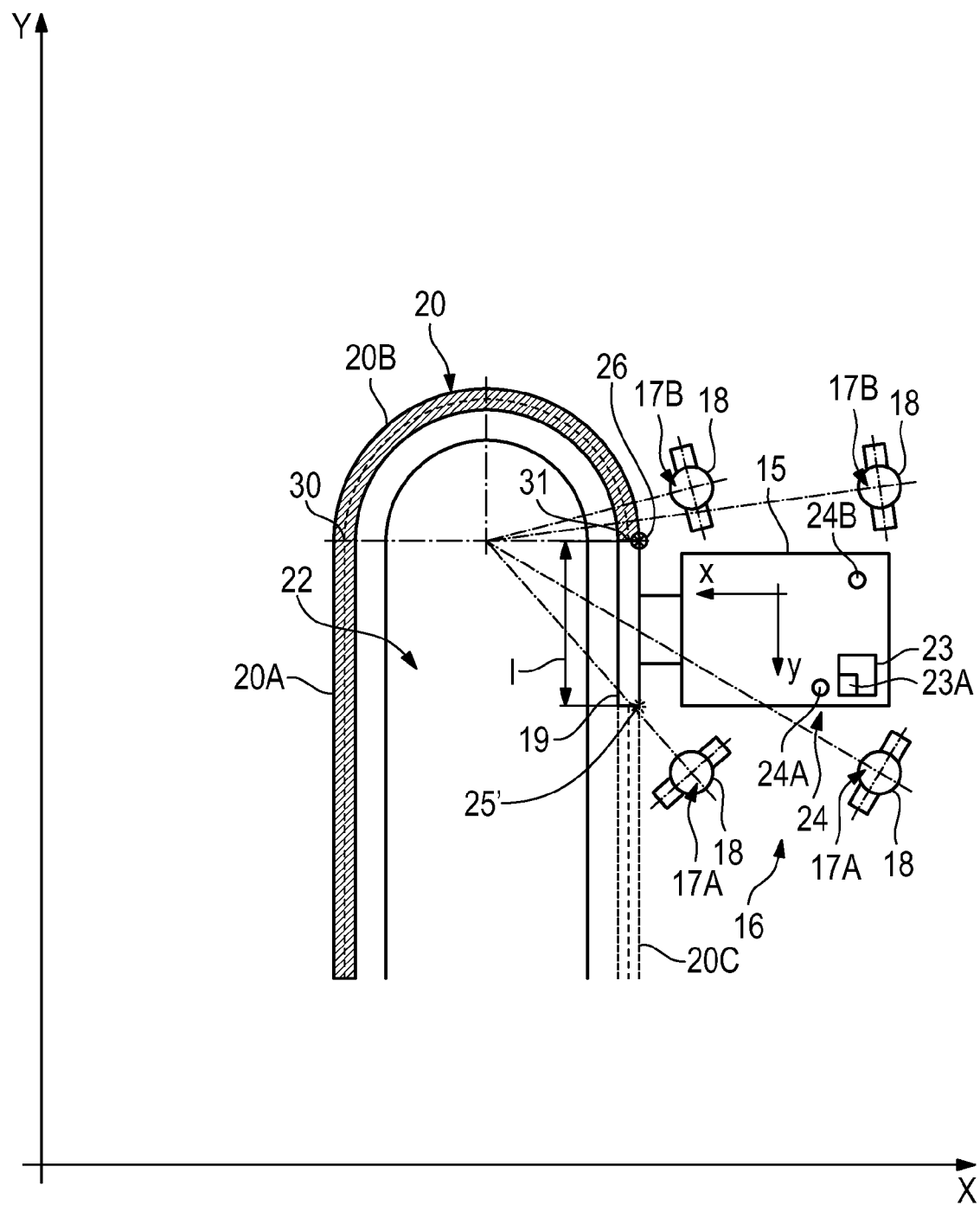
FIG. 3.9

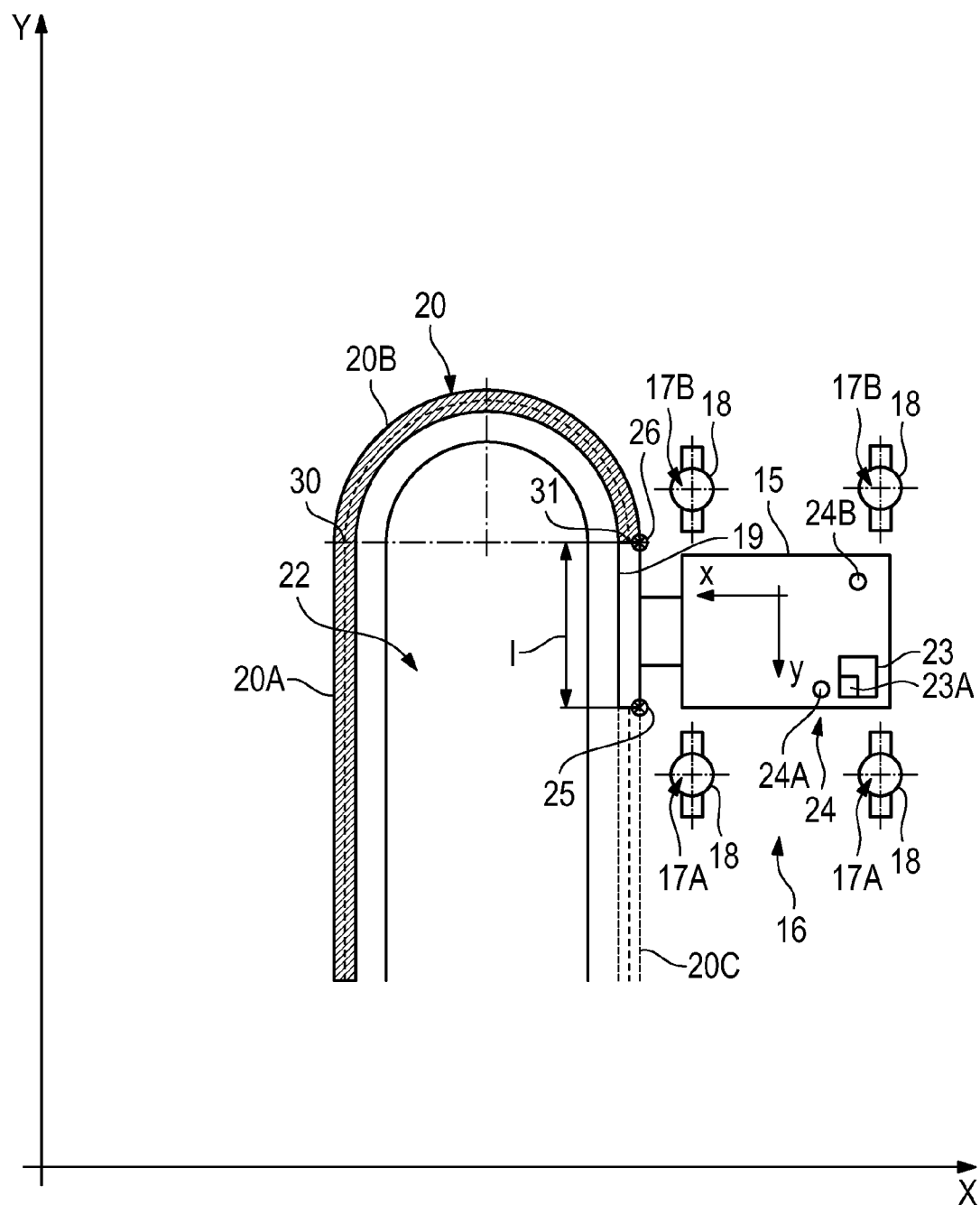
FIG. 3.10

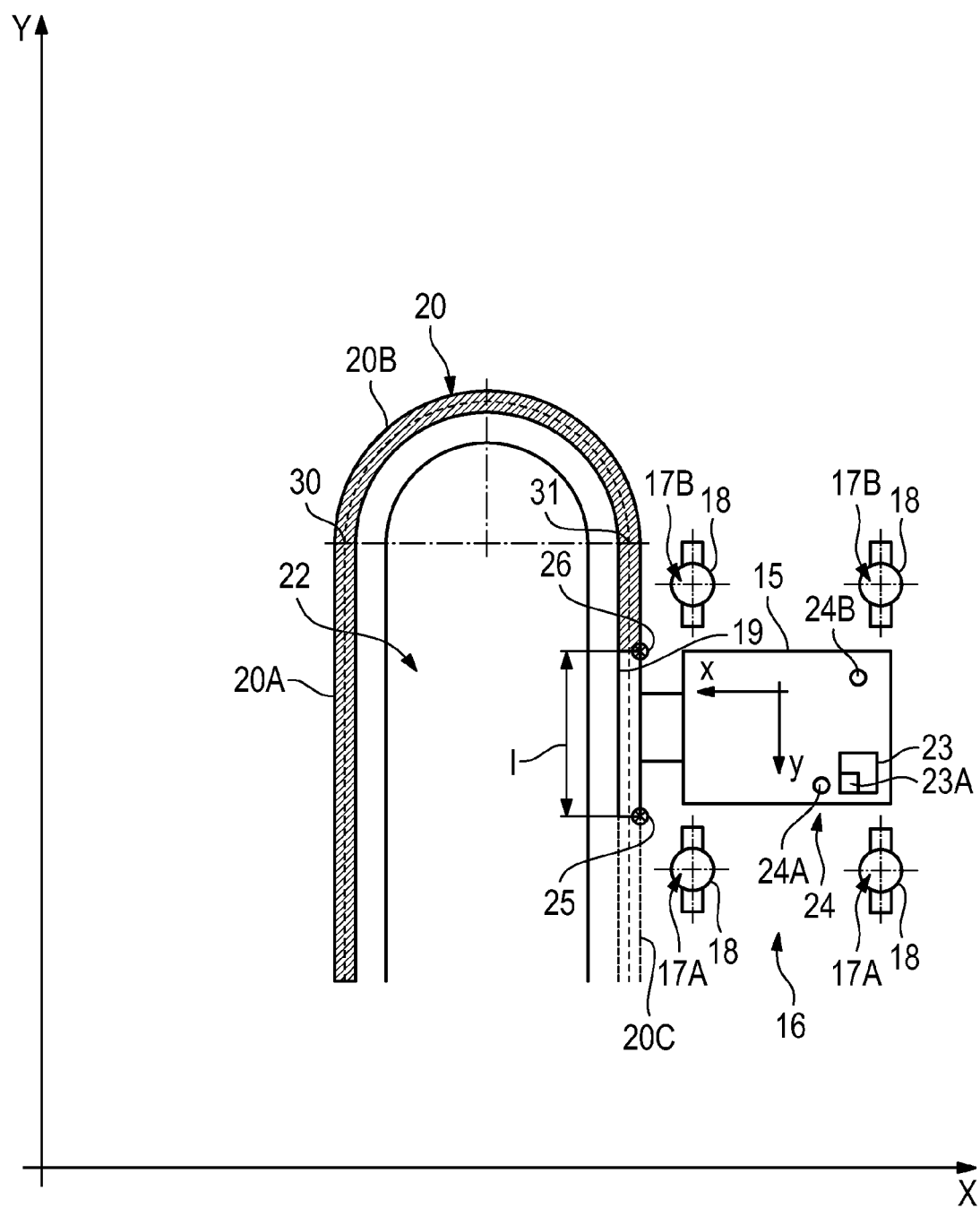
*FIG. 3.11*

SELF-PROPELLED CIVIL ENGINEERING MACHINE AND METHOD OF CONTROLLING A CIVIL ENGINEERING MACHINE

BACKGROUND OF THE INVENTION

1. Field of the Invention

The invention relates to a self-propelled civil engineering machine, and in particular a slipform paver, and to a method of controlling a self-propelled civil engineering machine.

2. Description of the Prior Art

There are a variety of known types of self-propelled civil engineering machine. Such machines include for example known slipform pavers or road milling machines. A distinguishing feature of self-propelled civil engineering machines is that they have a working unit which is arranged on a chassis of the machine and which has work-doing means for producing structures on a piece of ground or for changing the piece of ground.

On known slipform pavers, the working unit comprises an arrangement for moulding flowable material, and in particular concrete, which will also be referred to below as a concrete mould. Structures of different configurations, such as crash barriers or traffic islands for example, can be produced with the concrete mould. A slipform paver is described in, for example, EP 1 103 659 B1.

The working unit of known road milling machines is a milling arrangement which has a milling drum fitted with milling tools with which material can be milled off the ground over a preset working width.

Known civil engineering machines also have a drive unit having driving means to enable translatory or rotational movements to be performed by the civil engineering machine on the ground, and a control and calculating unit to control the drive unit in such a way that the civil engineering machine performs the translatory and/or rotational movements on the ground.

To produce structures on the ground or to change the ground, an attempt is made in the case of self-propelled civil engineering machines to achieve largely automatic control of the civil engineering machine without the need for any interventions worth mentioning by the driver of the machine. When the civil engineering machine is being controlled automatically, the drive unit of the civil engineering machine is controlled in such a way that, starting from a preset starting point at which the civil engineering machine is in a preset position and at a preset orientation on the ground, a reference point on the civil engineering machine is moved for a preset distance or path of travel or at a preset spacing therefrom, i.e. along a line equidistant from the distance or path of travel, in order to produce a structure or to change the ground. The preset distance or path of travel is defined by straight lines and/or curves in this case.

A known method of controlling self-propelled civil engineering machines presupposes the use of a string line by which the desired distance or path of travel or a line equidistant from the desired distance or path of travel is preset. It is also known for self-propelled civil engineering machines to be controlled by the use of a global navigation satellite system (GNSS). A road milling machine whose drive unit is controlled by a string line is known for example from U.S. Pat. No. 4,041,623. U.S. Pat. No. 5,988,936 describes a slipform paver having a system for controlling the drive unit by the use of a string line. In the case of both these civil engineering machines, the spacing between a reference point on the civil engineering machine and the string line is determined by sensing members which detect the string line.

The slipform paver which is known from U.S. Pat. No. 5,988,936 has a sensing member which is at the front in the direction of operation and a sensing member which is at the rear in that direction and a central sensing member which is arranged between the front and rear sensing members. All the sensing members lie on a common axis which extends parallel to the longitudinal axis of the slipform paver. The sensing members define reference points on the civil engineering machine.

When the slipform paver is moving along a straight section of the desired distance or path of travel, both the sensing member which is at the front in the direction of operation and the sensing member which is at the rear in that direction are in use and the drive unit is thus controlled both as a function of the distance measured between the associated front reference point on the civil engineering machine and the string line and as a function of the distance measured between the associated rear reference point and the string line. The drive unit is so controlled in this case that the spacing from the string line is equal to a desired value. Control of this kind has proved satisfactory in practice.

When the slipform paver is moving along a curved section on the other hand, the control of the drive unit takes place as a function only of the spacing which is measured between the associated central reference point on the civil engineering machine and the string line. The front and rear sensing members are not active in this case.

At the transition from a straight section to a curved section or vice versa, a changeover is therefore needed between the various sensing members. At the entry into the curve, a changeover is made from the front and rear sensing members to the central sensing member and at the exit from the curve a changeover is made back from the central sensing member to the front and rear ones. A changeover to various different sensing members proves to be a disadvantage simply because the changeover means that the process is not a continuous one. It is also a disadvantage that, when travel through a curve is controlled by the central sensing member, the position of the sensing member depends on the radius of the curve.

If however the slipform paver is to change its direction of operation at the transition from a straight section to a curved section, then problems arise in practice when the drive unit is controlled in the known way where provision is made for a changeover from the front and rear sensing members to the central sensing member at the entry into the curve. What is a particular problem for the control system in this case is entry into tight curves, such for example as when concrete components in the form of traffic islands are being produced.

It has also been found that the transition from the straight section of the desired distance or path of travel to the curved section is a particular problem for the control of the civil engineering machine, because the position of the discontinuity is not precisely known. It is true that in practice the driver of the machine can specify that the entry into the curve is to start. However, the exact position of the discontinuity is difficult for the driver of the machine to estimate. The position of the discontinuity cannot be determined solely by monitoring the spacing between the front reference point and the string line, which increases at the entry into the curve, simply because the control system is intended to correct any difference between the reference point and the string line, i.e. to keep the spacing to zero. Even if the changeover should take place at exactly the right point in time, what results in practice will be an abrupt steering command because it is most unlikely that the central reference point will be at exactly the same spacing from the string line as the front and/or rear reference point at the time of the changeover.

SUMMARY OF THE INVENTION

The object underlying the invention is to improve the automatic control of a self-propelled civil engineering machine particularly when the civil engineering machine is moving from a substantially straight section of the preset distance or path of travel onto a curved section thereof.

The way in which this object is achieved in accordance with the invention is by virtue of the features of the independent claims. The dependent claims relate to advantageous embodiments of the invention.

The civil engineering machine according to the invention and the method according to the invention are based on the position of at least one reference point which is relevant to the control of the drive unit of the civil engineering machine being changed, as the civil engineering machine moves, as a function of the line followed by the desired distance or path of travel in a co-ordinate system referred to the civil engineering machine. The position of the reference point is preferably changed continuously. It is however also possible for the position of the reference point to be changed in individual steps. All that is crucial is for the reference point to assume a plurality of different positions.

Before the transition from a substantially straight section of the desired distance or path of travel to a curved section of the desired distance or path of travel, i.e. before the discontinuity, the position of the at least one reference point is shifted from a position which is at the front in the direction of operation to a position which is at the rear in the direction of operation, whereas after the transition from a substantially straight section of the desired distance or path of travel to a curved section, i.e. after the discontinuity, the position of the at least one reference point is shifted from a position which is at the rear in the direction of operation to a position which is at the front in the direction of operation.

What is meant in this case by a shift in the position of the reference point is that what is taken for the purpose of controlling the drive unit is not the position of a fixed reference point in the co-ordinate system referred to the civil engineering machine but that the reference point for determining position moves at the entry into the curve.

This reference point may be an "imaginary" point on the civil engineering machine. The desired distance or path of travel may also be an "imaginary" distance or path. This will be the case when the desired distance or path of travel is laid down in a co-ordinate system and the position of the reference point is determined by reference to the desired distance or path of travel using a global navigation satellite system (GNSS). If however the desired distance or path of travel is laid down on the ground by a string line and if the spacing of a reference point from a string line is measured by means of a spacing sensor, then the reference point is laid down by the location of the sensor on the civil engineering machine.

What is meant by a substantially straight section may in practice also be a section which has a radius. In practice, a section whose radius is for example more than 10 m may be considered to be a substantially straight section.

In a preferred embodiment of the invention, the control and calculating unit of the civil engineering machine has means for determining the deviation from a desired distance or path of travel of a reference point on the civil engineering machine which is at the front in the direction of operation and of a reference point thereon which is at the rear in the direction of operation, the control and calculating unit being so designed that, in a first mode of control, the drive unit is controlled as a function of the deviation of the reference points at the front and rear in the direction of operation when the civil engineering machine is moving along a substantially straight section of the desired distance or path of travel, the front and rear reference points thus moving along the desired distance or path of travel or along the desired distance or path of travel at a preset spacing therefrom, i.e. along a line equidistant from the desired distance or path of travel.

The control and calculating unit is so designed that the reference point which is at the front in the direction of operation is shifted from a position which is at the front in the direction of operation to a position which is at the rear in the direction of operation before the transition from a substantially straight section of the desired distance or path of travel to a curved section of the desired distance or path of travel. After the transition from a substantially straight section of the desired distance or path of travel to a curved section of the desired distance or path of travel, the reference point which is at the front in the direction of operation is shifted from the position which is at the rear in the direction of operation back to the position which is at the front in the direction of operation.

The control and calculating unit is preferably so designed that, in a second mode of control, the drive unit is controlled as a function of the position of the reference point which is at the rear in the direction of operation when the civil engineering machine is moving along a curved section of the desired distance or path of travel, the rear reference point thus moving along the desired distance or path of travel or along the desired distance or path of travel at a spacing therefrom. Alternatively, the machine might also be controlled along the curved section from two reference points situated next to and very close to one another, one of which would then be situated a short distance in front of the outlet from the mould and the other would be situated a short distance behind it.

The drive unit having the driving means to enable the civil engineering machine to perform translatory and/or rotational movements on the ground preferably has front wheels or running-gear units and rear wheels or running-gear units and a steering arrangement for steering the front wheels or running-gear units and/or the rear wheels or running-gear units.

Basically, entry into a curve can be initiated by the driver of the machine by his operating for example a switch, push-button or the like. It is however also possible for entry into a curve to be detected by the use of a global navigation satellite system (GNSS), the desired distance or path of travel being laid down in a co-ordinate system and the position of the discontinuity thus being known.

An embodiment of the invention will be explained in detail in what follows by reference to the drawings.

BRIEF DESCRIPTION OF THE DRAWINGS

FIG. 3.1 is a highly simplified schematic view of a slipform paver in a first position where the slipform paver is moving along a straight section of a preset desired distance or path of travel.

FIG. 3.2 shows the slipform paver in a second position where the slipform paver is moving along the straight section towards a first discontinuity in the preset distance or path of travel.

FIG. 3.3 shows the slipform paver in a third position where the slipform paver is continuing to move along the straight section towards the first discontinuity in the preset distance or path of travel.

FIG. 3.4 shows the slipform paver in a fourth position where the slipform paver is situated at the first discontinuity in the preset distance or path of travel.

FIG. 3.5 shows the slipform paver in a fifth position where the slipform paver is situated at the first discontinuity.

FIG. 3.6 shows the slipform paver in a sixth position where the slipform paver is moving along a curved section of the preset distance or path of travel.

FIG. 3.7 shows the slipform paver in a seventh position where the slipform paver is moving along the curved section of the preset distance or path of travel towards a second discontinuity.

FIG. 3.8 shows the slipform paver in an eighth position where the slipform paver is continuing to move along the curved section of the preset distance or path of travel towards the second discontinuity.

FIG. 3.9 shows the slipform paver in a ninth position where the slipform paver is situated at the second discontinuity.

FIG. 3.10 shows the slipform paver in a tenth position where the slipform paver is situated at the second discontinuity.

FIG. 3.11 shows the slipform paver in an eleventh position after the transition from the curved section of the preset distance or path of travel to the straight section thereof.

DETAILED DESCRIPTION

Figure 1:
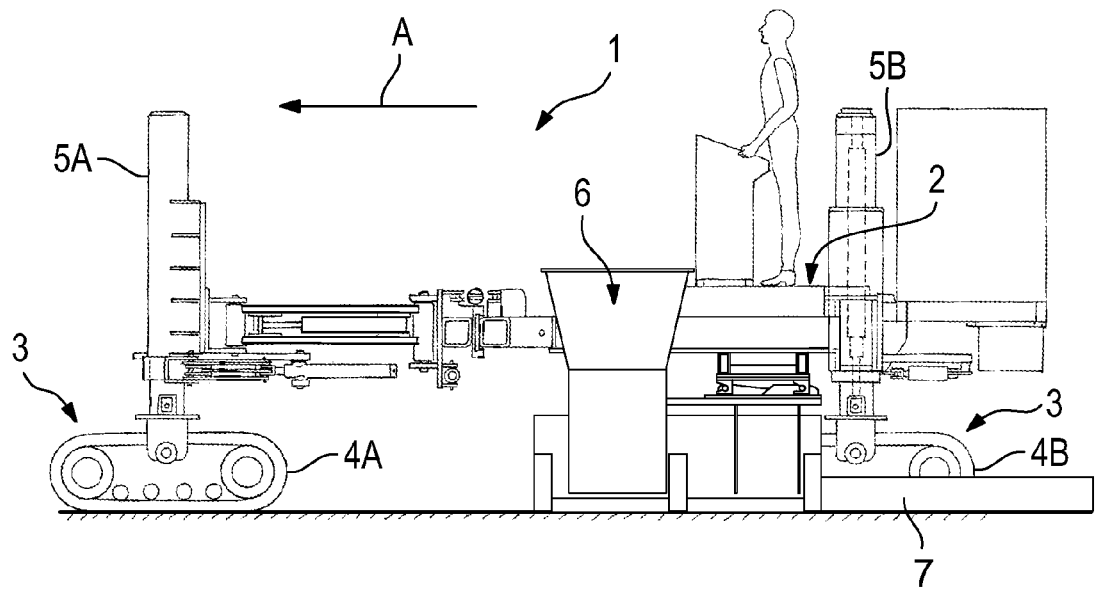
FIG. 1 is a view from the side of an embodiment of a slipform paver.

FIG. 1 is a view from the side of a slipform paver which serves as an example of a self-propelled civil engineering machine. Because slipform pavers as such are part of the prior art, all that will be described here are those components of the civil engineering machine which are material to the invention.

The slipform paver 1 has a chassis 2 which is carried by running gear 3. The running gear 3 has two front and two rear track-laying running-gear units 4A, 4B which are fastened to front and rear lifting columns 5A, 5B. The direction of operation (direction of travel) of the slipform paver is indicated by an arrow A.

The track-laying running-gear units 4A, 4B and the lifting columns 5A, 5B are part of a drive unit to enable the civil engineering machine to perform translatory and/or rotational movements on the ground. By raising and lowering the lifting columns 5A, 5B, the chassis 2 of the machine can be moved relative to the ground to adjust its height and inclination. The civil engineering machine can be moved backwards and forwards with the steerable track-laying running-gear units 4A, 4B. The civil engineering machine thus has three degrees of freedom in translation and three in rotation.

The slipform paver 1 has an arrangement 6 for moulding concrete which is only indicated and which will be referred to below as a concrete mould. The concrete mould is part of a working unit which has work-doing means for producing a structure 7 of a preset shape on the ground.

Figure 2:
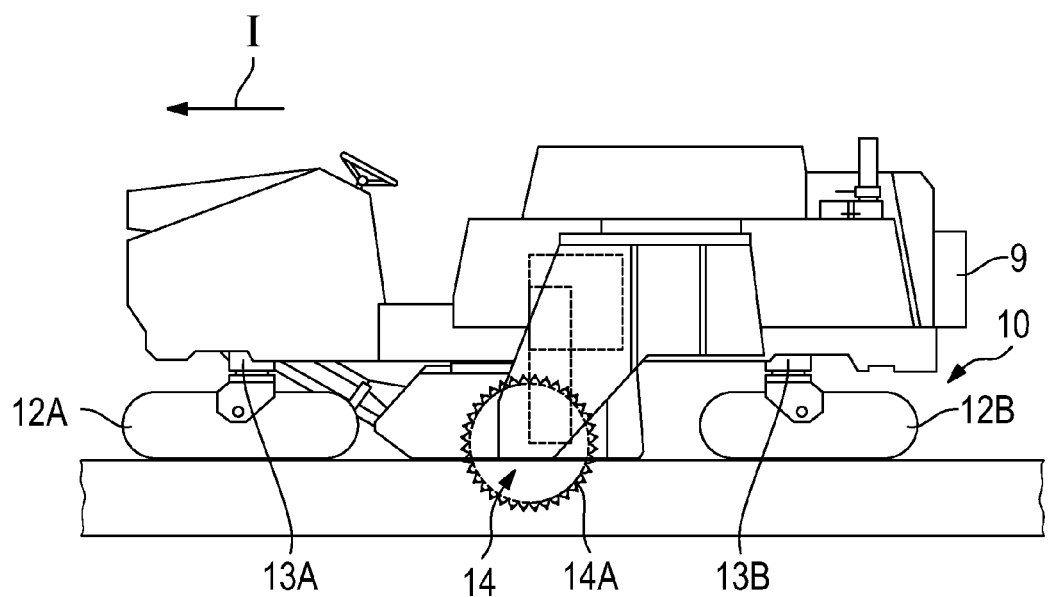
FIG. 2 is a view from the side of an embodiment of a road milling machine.

FIG. 2 is a view from the side of a self-propelled road milling machine which serves as a further example of a civil engineering machine. The road milling machine too has, once again, a chassis 9 which is carried by running gear 10. The running gear 10 once again has front and rear track-laying running-gear units 12A, 12B which are fastened to front and rear lifting columns 13A, 13B. The road milling machine has a working unit 14 which has work-doing means to change the ground. This is a milling arrangement 14 having a milling drum 14A fitted with milling tools.

FIGS. 3.1 to 3.11 show various positions of a civil engineering machine, which is only shown in a highly simplified form, when entering and leaving a curve. The present embodiment is a slipform paver which is merely indicated. It has a chassis 15, a drive unit 16 having front and rear track-laying running-gear units 17A, 17B, a steering arrangement for steering the front and rear track-laying running-gear units 17A, 17B, and a concrete mould 19.

The slipform paver is going to produce, as a structure, a traffic island in the form of a "cigar". For this purpose, the slipform paver has to move along a preset distance or path of travel which will be referred to in what follows as the desired distance or path of travel 20. FIGS. 3.1 to 3.11 show only part of the desired distance or path of travel by which the geometrical shape of the cigar is defined.

The desired distance or path of travel 20 has a first straight section 20A which merges into a radiused section 20B covering 180°, which is again followed by a straight section 20C. In the present embodiment, the line followed by the desired distance or path of travel is laid down in a co-ordinate system (X, Y) which is independent of the movement of the civil engineering machine. As well as the fixed co-ordinate system (X, Y), what is also shown in FIGS. 3.1 to 3.11 is a co-ordinate system (x, y) referred to the civil engineering machine.

To control the drive unit 16, the civil engineering machine has a control and calculating unit 23 which is merely indicated. The control and calculating unit 23 controls the drive unit 16 in such a way that the civil engineering machine performs on the ground the translatory and/or rotational movements required to enable it to produce the structure 22 or change the ground when the civil engineering machine moves along the preset desired distance or path of travel. The control and calculating unit 23 comprises all the components required to carry out calculating operations and to generate control signals for the drive unit 16. It may be one self-contained sub-assembly or may comprise a plurality of separate sub-assemblies which may not only be arranged on the civil engineering machine but some or all of which may also be arranged on the ground near to the civil engineering machine.

In the present embodiment, the control and calculating unit 23 has a global navigation satellite system (GNSS) 24 which comprises a first GNSS receiver 24A and a second GNSS receiver 24B which are arranged in different positions on the civil engineering machine. As well as the two GNSS receivers, the global navigation satellite system (GNSS) may also have, on the ground, a reference station (not shown) for generating correcting signals. Using the two GNSS receivers, the GNSS system 24 determines data which gives the positions of the GNSS receivers in the co-ordinate system (X, Y). As well as this, the control and calculating unit may also have a programmable logic control system which is also referred to as a PLC system.

From the positions of the two GNSS receivers 24A, 24B and the known geometry of the civil engineering machine, the control and calculating unit 23 calculates the position of a reference point 25 on the civil engineering machine which is at the front in the direction of operation and the position of a reference point 26 on the machine which is at the rear in the direction of operation. The two reference points 25, 26 lie on a straight line which extends parallel to the longitudinal axis of the civil engineering machine. The rear reference point 26 is situated in this case in line with that edge of the concrete mould 19 which is on the inside and at the rear in the direction of travel. This edge corresponds to the outer boundary of the structure 22 to be produced. The two reference points are arranged at an original spacing I.

The control and calculating unit 23 also has means for determining data defining the line followed by the desired distance or path of travel 20. Using a virtual design model, the line followed by the desired distance or path of travel is preset in the co-ordinate system (X, Y). This design model may be entered manually or may be read into a memory 23A belonging to the control and calculating unit 23 from a data carrier.

As well as this, the control and calculating unit 23 also has means for determining the deviation from the desired distance or path of travel 20 of the positions of the reference point 25 which is at the front in the direction of operation and of the reference point 26 which is at the rear in the direction of operation.

The control and calculating unit 23 controls the drive unit, i.e. the front and rear track-laying running-gear units 17A, 17B, as a function of the spacing between the reference point and the desired distance or path of travel. The control and calculating unit provides for this purpose two different modes of control.

In the first mode of control, the drive unit 16 is controlled as a function of the spacing between the rear reference point 26 and the desired distance or path of travel 20 and as a function of the spacing between the front reference point 25 and the desired distance or path of travel. The control of the drive unit takes place in such a way that, this spacing of both the rear and the front reference points corresponds to a preset value during an advancing movement of the civil engineering, i.e. the civil engineering machine moves along the desired distance or path of travel at a preset spacing therefrom. The pivoted position of the rear track-laying running-gear units 17B is controlled in this case as a function of the deviation of the rear reference point 26 from the desired distance or path of travel 20 and the pivoted position of the front track-laying running-gear units 17A is controlled as a function of the deviation of the front reference point 25 from the desired distance or path of travel 20. The deviations of the reference points from the desired distance or path of travel are calculated by the control and calculating unit using the GPS system 24.

In the second mode of control on the other hand, the drive unit 16 is controlled as a function of the deviation only between the rear reference point 26 and the desired distance or path of travel 20. The control of the front track-laying running-gear units 17A takes place in such a way that the spacing of the rear reference point 26 on the civil engineering machine corresponds to a preset value during an advancing movement of the civil engineering machine, i.e. the rear reference point moves along the desired distance or path of travel at a preset spacing therefrom.

FIGS. 3.1 to 3.5 show the movement of the civil engineering machine as it advances along the straight section 20A of the desired distance or path of travel 20. During this movement, the control and calculating unit 23 presets the first mode of control and the two reference points 25, 26 are thus "active". The two reference points lie one behind the other in this case at a preset spacing l on an axis parallel to the longitudinal axis of the machine.

As it travels along the straight section 20A, the civil engineering machine approaches the first discontinuity 30, i.e. the point at which the straight section 20A merges into the curved section 20B. During this travel, the control and calculating unit 23 continuously determines not only the deviation of the reference points from the desired distance or path of travel but also the distance along the travel which the reference points have covered. The distance covered will be referred to in what follows as the stationing. Because the original spacing l of the reference points is known, all that needs to be determined is the distance along the travel covered by one of the reference points, because the distance covered along the travel by the other reference point can then be calculated.

The reference point 25 which is at the front in the direction of operation is now moving towards the discontinuity 30. As it does so, the control and calculating unit 13 determines whether the front reference point is still on the straight section 20A or whether it is already on the curved section on which the position of the front reference point is compared with the stored design model. Consequently, what is available is not only the deviation and stationing but also data on the curvature of the desired distance or path of travel, i.e. data which specifies whether the reference point is on or next to a straight or curved section of the desired distance or path of travel. All the data is written continuously to the memory 23A of the control and calculating unit 23.

At the point in time at which the reference point 25 which is at the front in the direction of operation reaches the discontinuity 30, the position of the front reference point is changed. The control and calculating unit generates a control signal at this point in time because the front reference point "detects" the beginning of the curve. The front reference point 25 is then shifted backwards along the straight line, in the co-ordinate system (x, y) referred to the machine, in the opposite direction to the direction of operation, (FIG. 3.2 and FIG. 3.3), until the front reference point is at a preset spacing from the rear reference point on the straight line or, preferably, until the front reference point is on the rear reference point (FIG. 3.4). As this is done, the spacing l between the two reference points is reduced by the amount by which the stationing increases. It is noted that in FIGS. 3.2-3.4 the actual spacing between the points 25 and 26 is changing and is less than the original spacing I which is illustrated for comparison. The shifting of the front reference point preferably takes place continuously. The control signal is preferably generated by the control and calculating unit when the reference point is exactly on the discontinuity. Basically however, it is also possible for the control signal to be generated not when the reference point is exactly on the discontinuity but in the region of the transition between the substantially straight section (20A) and the curved section (20B), i.e. a short distance before it reaches the discontinuity or a short distance after it does so. In practice, the control signal is generated a short distance before the reference point reaches the discontinuity, thereby initiating the movement of the steering, and this movement of the steering is completed a short distance after the reference point reaches the discontinuity.

FIGS. 3.4 and 3.5 show that the front track-laying running gear units 17A and the rear track-laying running-gear units 17B are turned to the steering angle precisely when the front and rear reference points 25, 26 are on the discontinuity 30. In practice however, the process of turning to the steering angle is initiated when the front reference point is still a preset distance before reaching the discontinuity. Similarly, the process of turning to the steering angle is not completed until a preset distance after the front reference point reaches the discontinuity.

During the turning to the steering angle, the control and calculating unit 23 makes the changeover from the first mode of control to the second. This changeover may however equally well be made manually by the driver of the machine.

If the control and calculating unit 23 has preset the second mode of control, in which only the rear reference point 26 is "active", the front track-laying running-gear units 17A are controlled only as a function of the spacing of the rear reference point 26 from the desired distance or path of travel 20. In the course of this, the positions of the front and rear track-laying running-gear units meet the known condition for Ackermann steering, something which is indicated by dashed lines in the drawings.

If the rear track-laying running-gear units are situated at the point where the concrete mould is situated, the said rear track-laying running-gear units may remain steered in the straight-ahead position. Otherwise, the track-laying running-gear units are set to a theoretical or calculated steering angle which is not changed. This steering angle should meeting the condition for Ackermann steering.

FIGS. 3.6 to 3.9 show how the rear reference point 26 moves along the curved section 20B of the desired distance or path of travel 20 at a preset spacing therefrom. When this happens, steering is only by the front track-laying running-gear units 17A while no further change is made in the position of the rear track-laying running-gear units 17B.

When what was previously the rear reference point 26, which may be congruent with what was previously the front reference point 25, has reached the discontinuity, the control and calculating unit 23 again generates a control signal, after which the front reference point 25 is again shifted forward in the direction of operation.

The shifting of the front reference point 25 takes place until the spacing between the two points again corresponds to the original spacing l. Consequently, the front reference point 25, which is not "active", moves ahead of the rear reference point 26 which is "active". The front reference point 25 is shown as an asterisk designated as 25' because it is not "active".

FIG. 3.8 shows the civil engineering machine during its movement along the curved section of the preset distance or path of travel. When the rear reference point 26 on the civil engineering machine is on the discontinuity 31 (FIG. 3.9), the front and rear track-laying running-gear units 17A, 17B are re-positioned for straight-ahead travel (FIG. 3.10). However, in a similar way to what is done on entry into a curve, this steering process is already initiated when leaving a curve when there is still a preset distance of travel before the rear reference point 26 reaches the discontinuity. Similarly, the track-laying running-gear units are not positioned for straight-ahead travel until the rear reference point is a preset distance of travel past the discontinuity.

The control and calculating unit 23 thereupon again presets the first mode of control, and control thus again takes place as a function of the deviation of the two reference points from the desired distance or path of travel. The civil engineering machine is now moving again along a straight section 30B in the same way as it was before entering the curve.

The shifting of the front reference point 25 at the transition from a straight section to a curved section enables exact guidance of the civil engineering machine along the desired distance or path of travel to be achieved.

An alternative embodiment of civil engineering machine makes provision for use to be made not of a global navigation satellite system (GNSS) but of a string line. This embodiment differs from the embodiment employing the GNSS system only in that respective sensors (not shown) are provided at the front and rear reference points to measure the spacing from a string line (not shown) rather than the spacing from the virtual desired distance or path of travel. The string line then extends along the solid line (equidistant line) in the interior of the structure. The locations of the sensors are thus identical with the locations of the reference points. The spacing sensors may have mechanical sensing members or may be ultrasonic sensors which operate without physical contact. Sensors of these kinds are known in the prior art. The sensor which is at the rear in the direction of operation may be fastened to the chassis of the machine in a fixed position while the front sensor may be guided on a rail on the chassis of the machine to be displaceable in the longitudinal direction. The displacement of the front sensor may be carried out with a drive (not shown) which may for example be an electric-motor-driven spindle drive. Hence, what takes place in the alternative embodiment is a shift not of the front reference point but of the spacing sensor itself, what is done being not to calculate the spacing from a desired distance or path of travel defined by co-ordinates in a co-ordinate system but to measure the spacing from a string line which extends along the desired distance or path of travel. The above-mentioned advantages are obtained in both embodiments, and this is done by shifting the reference point or by shifting the sensor situated at a reference point.

What is claimed is:

1. A method of controlling a drive unit of a self-propelled civil engineering machine to enable the civil engineering machine to perform translatory and/or rotational movements on the ground, the method comprising:
   determining a deviation of at least one reference point on the civil engineering machine from a desired distance or path of travel which is defined by at least one straight line and/or curve;
   controlling the drive unit being controlled depending on the deviation of the at least one reference point on the civil engineering machine from the desired distance or path of travel in such a way that the reference point on the civil engineering machine moves along the desired distance or path of travel or along the desired distance or path of travel at a preset spacing therefrom, and
   changing a position of the at least one reference point relative to the civil engineering machine continuously depending on the position of the at least one reference point relative to the desired distance or path of travel.

2. The method according to claim 1, wherein, before a transition from a substantially straight section of the desired distance or path of travel to a curved section of the desired distance or path of travel, the position of the at least one reference point relative to the civil engineering machine is shifted from a position which is at the front in the direction of operation to a position which is at the rear in the direction of operation.

3. The method according to claim 2, wherein, after the transition from the substantially straight section of the desired distance or path of travel to the curved section of the desired distance or path of travel, the position of the at least one reference point relative to the civil engineering machine is shifted forward from the position which is at the rear in the direction of operation.

4. The method according to claim 1, wherein the deviation from a desired distance or path of travel of a reference point on the civil engineering machine which is at the front in the direction of operation and of a reference point thereon which is at the rear in the direction of operation is determined, the drive unit being controlled, in a first mode of control, depending on the deviation of the reference points at the front and rear in the direction of operation when the civil engineering machine is moving along a substantially straight section of the desired distance or path of travel, the front and rear reference points thus moving along the desired distance or path of travel or along the desired distance or path of travel at a spacing therefrom.

5. The method according to claim 4, wherein the reference point which is at the front in the direction of operation is shifted from a position which is at the front in the direction of operation to a position which is at the rear in the direction of operation before a transition from the substantially straight section of the desired distance or path of travel to a curved section of the desired distance or path of travel.

6. The method according to claim 5, wherein, after the transition from the substantially straight section of the desired distance or path of travel to the curved section of the desired distance or path of travel, the reference point which is at the front in the direction of operation is shifted forward from the position which is at the rear in the direction of operation.

7. The method according to claim 4, wherein the drive unit is controlled, in a second mode of control, depending on the position of the reference point which is at the rear in the direction of operation when the civil engineering machine is moving along a curved section of the desired distance or path of travel, the rear reference point thus moving along the desired distance or path of travel or along the desired distance or path of travel at a spacing therefrom.

8. The method according to claim 7, wherein, in the first mode of control, the position of front wheels or running-gear units and of rear wheels or running-gear units of the drive unit is varied depending on the deviation of the front reference point from the desired distance or path of travel and of the deviation of the rear reference point from the desired distance or path of travel and, in the second mode of control, the position of the front wheels or running-gear units is varied depending on the deviation of the rear reference point from the desired distance or path of travel.

9. A method of controlling a drive unit of a self-propelled civil engineering machine, the method comprising:
(a) defining a defined position of at least one reference point on the civil engineering machine;
(b) defining a desired path of travel of the at least one reference point relative to a ground surface, the desired path of travel including at least one substantially straight portion and at least one curved portion;
(c) determining a deviation of the at least one reference point from the desired path of travel;
(d) controlling the drive unit depending on the deviation such that the at least one reference point on the civil engineering machine moves along the desired path of travel; and
(e) changing the defined position of the at least one reference point on the civil engineering machine continuously depending on a relative position of the at least one reference point relative to the desired path of travel.

10. The method of claim 9, wherein:
step (e) further comprises, before the relative position of the at least one reference point relative to the desired path of travel reaches a transition from the substantially straight portion to the curved portion, shifting the defined position of the at least one reference point rearward relative to the civil engineering machine.

11. The method of claim 9, wherein:
in step (a), the at least one reference point includes a front reference point and a rear reference point; and
step (e) further comprises, before or when the front reference point reaches a transition from the substantially straight section of the desired path of travel to the curved section of the desired path of travel, shifting the defined position of the front reference point rearward toward the rear reference point.

12. The method of claim 11, wherein:
step (e) further comprises, continuing to shift the defined position of the front reference point rearward so that the front reference point is substantially coincident with the rear reference point by the time the rear reference point reaches the transition.

13. The method of claim 12, wherein:
step (e) further comprises, shifting the front reference point forward as the rear reference point traverses the curved section of the desired path of travel.

14. The method of claim 11, wherein:
step (e) further comprises, continuing to shift the defined position of the front reference point rearward so that the front reference point is at a preset spacing from the rear reference point by the time the rear reference point reaches the transition.

15. The method of claim 14, wherein:
step (e) further comprises, before or when the rear reference point reaches a second transition from the curved section to another substantially straight section of the desired path of travel, shifting the defined position of the front reference point forward relative to the civil engineering machine to an original spacing between the front and rear reference points.

16. The method of claim 9, wherein:
step (a) further comprises defining defined positions of a front reference point and a rear reference point;
step (d) further comprises controlling positions of front and rear wheels or running gear units of the drive unit; and
step (d) further comprises:
(d)(1) in a first mode of control, varying the position of the front and rear wheels or running-gear units depending on a deviation of the front reference point from the desired path of travel and a deviation of the rear reference point from the desired path of travel; and
(d)(2) in a second mode of control, varying the position of the front wheels or running-gear units depending on the deviation of the rear reference point from the desired path of travel.

* * * * *

UNITED STATES PATENT AND TRADEMARK OFFICE
CERTIFICATE OF CORRECTION

PATENT NO. : 9,598,080 B2  
APPLICATION NO. : 14/922790  
DATED : March 21, 2017  
INVENTOR(S) : Fritz et al.

Page 1 of 1

It is certified that error appears in the above-identified patent and that said Letters Patent is hereby corrected as shown below:

Column 10, Line 42, after "unit" delete "being controlled".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*